United States Patent
Gurney et al.

(10) Patent No.: US 9,305,571 B2
(45) Date of Patent: Apr. 5, 2016

(54) MAGNETIC DEVICES AND MAGNETIC MEDIA WITH GRAPHENE OVERCOAT

(75) Inventors: Bruce A. Gurney, San Jose, CA (US); Ernesto E. Marinero, Saratoga, CA (US); Simone Pisana, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 1021 days.

(21) Appl. No.: 12/646,851

(22) Filed: Dec. 23, 2009

(65) Prior Publication Data

US 2011/0151278 A1    Jun. 23, 2011

(51) Int. Cl.
  *G11B 5/72*  (2006.01)
  *G11B 5/31*  (2006.01)
  *G11B 5/84*  (2006.01)
  *G11B 5/10*  (2006.01)

(52) U.S. Cl.
  CPC .............. *G11B 5/3106* (2013.01); *G11B 5/72* (2013.01); *G11B 5/8408* (2013.01); *G11B 5/102* (2013.01)

(58) Field of Classification Search
  None
  See application file for complete search history.

(56) References Cited

U.S. PATENT DOCUMENTS

| | | | |
|---|---|---|---|
| 2001/0055700 A1* | 12/2001 | Dykes et al. | ............ 428/694 TC |
| 2003/0096140 A1* | 5/2003 | Tomiyasu et al. | ....... 428/694 BS |
| 2004/0202843 A1* | 10/2004 | Moriwaki et al. | ......... 428/195.1 |
| 2005/0249980 A1* | 11/2005 | Itoh et al. | ...................... 428/828 |
| 2006/0154114 A1* | 7/2006 | Kanagawa et al. | ........... 428/837 |

OTHER PUBLICATIONS

Novoselov et al. "Electric Field Effect in Atomically Thin Carbon Films." Science. 306. (2004): 666-669.*
Katsnelson, M. "Graphene: carbon in two dimensions." Materialstoday. 10. (2007): 20-27.*
Saito, R.; Fujita, Mitsutaka; Dresselhaus, G.; Dresselhaus, M. (1992). "Electronic structure of graphene tubules based on C60". Physical Review B46 (3): 1804-1811.*

* cited by examiner

*Primary Examiner* — Mark Ruthkosky
*Assistant Examiner* — Lisa Chau
(74) *Attorney, Agent, or Firm* — Zilka-Kotab, PC

(57) ABSTRACT

A magnetic disk according to one embodiment includes a recording layer; and a layer of graphene formed above the recording layer. A nucleation layer may be formed between the recording layer and the graphene layer in some approaches. A magnetic device according to another embodiment includes a transducer; a nucleation layer formed above the transducer; and a layer of graphene formed on the nucleation layer. A method according to one embodiment includes forming a nucleation layer above a magnetic layer of a magnetic disk or magnetic device; and forming a layer of graphene on the nucleation layer. A method according to another embodiment includes depositing SiC above a magnetic layer of a magnetic disk or magnetic device, the SiC being equivalent to several monolayers thick; and surface heating the SiC to selectively evaporate some of the Si from the SiC for forming a layer of graphene on a SiC layer. Additional products and methods are also presented.

20 Claims, 4 Drawing Sheets

100

| | Illustrative Material | Function |
|---|---|---|
| 120 | Lubricant | Tribology |
| 118 | Graphene | Protection |
| 117 | Nucleation Layer | |
| 116 | Capping Layer | Writability |
| 114 | CoPtCr-Oxide | Storage |
| 112 | Ru (high pressure) | Texture and Segregation |
| 110 | Ru (low pressure) | |
| 108 | NiW | Seed Layer |
| 106 { | CoFeTaZr | Soft Underlayer II |
| | Ru | AFC Layer |
| | CoFeTaZr | Soft Underlayer I |
| 104 | AlTi | Adhesion Layer |
| 102 | Glass | Substrate |

MAGNETIC DEVICES AND MAGNETIC MEDIA WITH GRAPHENE OVERCOAT

FIELD OF THE INVENTION

The present invention relates to magnetic recording, and more particularly to magnetic devices and media with a graphene overcoat.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The continuing reduction of the bit size as magnetic recording densities are increased requires that the spacing between the sensor and the recording medium also be decreased. For example for 1 Tb/in$^2$ the spacing should typically be 5 nm or less in order to attain the required signal to noise ratio (SNR). The presently-used carbon overcoat (COC) thickness needs to be reduced to 1 nm to satisfy this spacing requirement. Currently, there exists no viable alternative to reduce the thickness of current-art amorphous diamond-like-carbon (DLC) layers down to 1 nm thickness while maintaining the overcoat mechanical strength and its corrosion protection. At even higher areal densities, overcoat thickness down to the dimensions of a single atomic layer of carbon will be needed.

SUMMARY OF THE INVENTION

A magnetic disk according to one embodiment includes a recording layer; and a layer of graphene formed on the nucleation layer.

A magnetic device according to another embodiment includes a transducer; a nucleation layer formed above the transducer; and a layer of graphene formed above the recording layer.

A method according to one embodiment includes forming a nucleation layer above a magnetic layer of a magnetic disk or magnetic device; and forming a layer of graphene on the nucleation layer.

A method according to another embodiment includes depositing SiC above a magnetic layer of a magnetic disk or magnetic device, the SiC being equivalent to several monolayers thick; and surface heating the SiC to selectively evaporate some of the Si from the SiC for forming a layer of graphene on a SiC layer.

A method according to yet another embodiment includes forming graphene on a sacrificial layer; transferring the graphene onto a polymer carrier; transferring the graphene and polymer carrier onto a magnetic disk or magnetic device; and removing the polymer material.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

DETAILED DESCRIPTION

Figure 1:
FIG. 1 is a schematic representation of multilayered granular perpendicular recording media according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses the fabrication and usage of graphene as a protective overcoat to meet future spacing requirements in magnetic recording and for use in other applications.

A magnetic disk according to one general embodiment includes a recording layer; and a layer of graphene formed above the recording layer. A mono- or multi-layer nucleation layer may be formed between the recording layer and the graphene layer in some approaches.

A magnetic device such as a magnetic head, slider, sensor for bio-applications, etc. according to another general embodiment includes a transducer; a mono- or multi-layer nucleation layer formed above the transducer; and a layer of graphene formed on the nucleation layer.

A method according to one general embodiment includes forming a nucleation layer above a magnetic layer of a magnetic disk or magnetic device; and forming a layer of graphene on the nucleation layer.

A method according to another general embodiment includes depositing SiC above a magnetic layer of a magnetic disk or magnetic device, the SiC being equivalent to several monolayers thick; and surface heating the SiC to selectively evaporate some of the Si from the SiC for forming a layer of graphene on a SiC layer.

A method according to yet another general embodiment includes forming graphene on a sacrificial layer; transferring the graphene onto a polymer carrier; transferring the graphene and polymer carrier onto a magnetic disk or magnetic device; and removing the polymer material.

Graphene is a single atomic sheet of $sp^2$-bonded carbon atoms that are densely packed in a honeycomb crystal lattice. The carbon-carbon bond length in graphene is approximately 0.142 nm and a monolayer of graphene is approx. 0.2 nm thick. Continuous graphene films have been shown to be impermeable to even atomic Helium, rendering such layers amenable to protection against corrosion.

Mechanical measurements have shown that graphene is the strongest material ever tested. Therefore graphene is potentially the ultimate overcoat for magnetic recording applications. However, the synthesis of graphene has heretofore been incompatible with the fabrication of magnetic recording media. Embodiments of the present invention include novel structures and methods to permit the use of graphene as a protective overcoat for hard disk and recording sensor applications, as well as other applications.

To exploit the exceptional properties of graphene as a protective overcoat for magnetic storage applications, several challenges must be overcome, such as 1) how to create conformal growth of graphene over the recording medium or the sensor device with monolayer thickness control; 2) epitaxial graphene growth to develop the crystallographic structure responsible for its unique physical properties; and 3) how to integrate the graphene growth into a recording medium or, sensor device deposition system. A suitable growth method compatible with processes employed for media and sensor layer fabrication is highly desirable.

Recording media and magnetic thin film stacks for sensor applications exhibit roughness values (rms) ranging from 0.1 to 1 nm. In media, this is due to the morphology developed by said films through processing steps of the media stack that aim to optimize the recording layer(s)' magnetic properties. The adatom mobility and the heterogeneous nucleation of the growth process are responsible for the development of the film roughness and it constitutes one of the most significant challenges in recording media in efforts to reduce the thickness of amorphous DLC below 3 nm, as well as the fly height of the magnetic head read/write assembly.

A variety of approaches to synthesize graphene have been studied for their ability to produce single and multi-layer graphene sheets. The most relevant growth methods for information storage applications presently appear to be: 1) use of a seed layer and a suitable vapor phase precursor to achieve graphene growth at elevated temperatures. Examples of this include the use of hydrocarbons together with Ni, Ru and Cu metallic seed layers at growth temperatures around 900° C. Another approach is the use of a SiC surface which is annealed at comparable temperatures to promote the selective evaporation of Si at the surface, which under optimum conditions leaves behind an atomically thin graphene layer adhered to the underlying SiC structure. Whereas for basic research on graphene, the use of ultra-high vacuum hardware for growth studies on seed layers is common, such stringent growth conditions may be impractical for rapid, low cost manufacturing applications. Furthermore, said demanding growth conditions are imperative for attaining optimum transport characteristics in graphene, which are not needed for most overcoat applications.

For corrosion protection, the hard overcoat is preferably contiguous with the surface it protects and conformal so there are no areas not protected. This is difficult to accomplish at the comparatively low growth temperatures typically employed for hard disk and read sensor deposition. The use of multilayer hard coats is a potential solution in that discontinuities in one film component do not necessarily transfer onto a subsequently deposited overlayer. Examples of this include: combinations of C/SiN as well as CNx/CHx or CHx/C dual layer overcoats.

Some embodiments of the present invention use of dual layer structure comprising a suitable seed layer material such as Ru, Ni, Cu, Co, Pd, Pt, Ir, TaC, TiC, and/or WC deposited directly on top of the recording medium or sensor thin film stack. The thickness of the seed layer and the graphene layer typically ranges from about 0.2 nm to about 2.5 nm (where "about X nm" means X±0.1 nm) and is deposited in a growth chamber which forms part of a multi-growth station system. The growth temperature of the seed layer can be controlled from the nominal deposition ambient temperature to elevated temperatures. The latter may be achieved by the use of directional heating provided by, for example, a radiative heater such as an incandescent filament heater, a flash lamp (preferably operating in the ultraviolet wavelength), a short-pulse laser source, electron heater, etc. or a combination thereof. A mechanism may be used for introducing a graphene-precursor, preferably Acetylene, Ethylene, Propylene, Benzene, Ethanol, CO, and/or other suitable hydrocarbon precursors that readily release carbon at temperatures below 500° C. The introduction and pyrolysis, decomposition or dehydrogenation of the precursor can be effected either in the same chamber as the one employed to deposit the seed layer, in a nearby and vacuum-isolated chamber which is also part of the in-line deposition tool, etc. Said separate chamber preferably also has independent directional heaters such as those mentioned above.

It is noted that the use of the metallic seed layer/graphene combination offers the additional advantage that said dual layers can provide corrosion protection even if the graphene layer is not fully contiguous over small length scales.

Current state-of-the-art perpendicular recording media comprises a multilayered stack of different materials to achieve the following typical requisites for the recording magnetic material: 1) out-of-plane c-axis orientation with strong crystallographic texture, and 2) the development of a recording media microstructure comprising small magnetic grains, segregated by a secondary non-magnetic phase (preferably an oxide component).

An example of a recording media according to an illustrative embodiment of the present invention is depicted in FIG. 1. The block diagram on the right side of the figure identifies the functionality of the various components. Note that this illustrative structure is presented by way of example only to show an illustrative layer of graphene on media, and one skilled in the art will appreciate that there are many different combinations of layers and/or materials that may be used to construct magnetic media, any of which may be used in conjunction with various embodiments of the present invention.

Referring to FIG. 1 and starting from the bottom, the illustrative multilayered perpendicular recording media 100 comprises a plurality of layers that provide different functionalities. First, an adhesion layer 104 is often placed directly on the substrate 102 (commonly glass) to improve adhesion. This is followed by deposition of a high permeability magnetic material(s), the soft underlayer (SUL) 106. This is preferentially a trilayer structure comprising two magneticallysoft films which are antiferromagnetically coupled via an ultrathin Ru interlayer. The functionality of this soft underlayer is to provide magnetic field flux closure for the field emanating from the recording head, thereby making the recording medium more facile to write. A seed layer 108 is employed to induce the correct crystallographic orientation and strong texture of the underlayer(s) 110, 112. In the case of Ru or other hcp metals and metal alloys, seed layers such as NiW, NiWCr, CuNb, etc., tend to foster the growth of the hexagonal basal plane parallel to the substrate surface, thereby providing an appropriate template for pseudo-epitaxial growth of the polycrystalline hcp Co-based storage medium 114. The Ru underlayer or its equivalent may also be judiciously processed to drive the formation of a segregated magnetic recording material. The magnetic layer target may contain, in addition to metallic components (such as Co, Fe, Ni, Pt and Cr), oxide segregants such as $SiO_x$, $Ta_xO_y$, $TiO_x$, $BO_x$, $CoO_x$, etc., or admixtures of these oxide segregants. Optimized sputter deposition conditions of said composite magnetic media results in a thin film having ferromagnetic, grains or islands segregated by the oxide phase. The next layer(s) disposed on top of the recording medium 114 is(are) an additional magnetic layer(s) 116 with an inherently higher degree of magnetic exchange, and is employed to improve the writeability of the recording medium through an exchange-spring mechanism. A nucleation layer 117 is formed above the capping layer 116. A thin graphene overcoat 118 and optional lubricant 120 are deposited to environmentally protect the recording layers and facilitate flyability in a recording device.

The morphology of the Ru underlayer 110, 112 in the illustrative embodiment is a key force in determining the granular structure of the magnetic recording layer 114. As indicated in the block diagram of FIG. 1, a dual Ru layer 110, 112 is employed to control the recording medium segregation. In particular it is noted that the Ru layer upon which the magnetic alloy is deposited is grown under high pressure conditions. This produces a Ru microstructure exhibiting columnar growth and interface roughness. Examination of TEM cross-sectional images of magnetic media indicates that the local roughness (from grain to grain) at the interface of the capping layer 116 and the graphene overcoat 118 can exceed a few nanometers. On the other hand, it is noted that the grain domes are typically quite smooth and therefore, if the graphene overcoat has sufficient adatom mobility, one can expect good growth conformality. While this has been a challenge in current media using a carbon overcoat, because both the magnetic layers and the carbon overcoat are grown at the sputter ambient temperature which is typically between 50° C. and 80° C., the methodology presented below illustrates that a graphene layer may be reliably applied to a magnetic medium.

It should be noted that fabrication of future bit patterned media (BPM) may include a planarizing step to reduce or eliminate the surface roughness in order to improve flyability and reduce the spacing which may be requirements for >Tb/$in^2$ recording. The planarizing step can be potentially implemented before the overcoat deposition, which would greatly facilitate the growth continuity of the hard overcoat on said BPM recording structures resulting in superior mechanical properties and corrosion-resistance. It is also pointed out also that planarizing steps could also be implemented in the fabrication of granular perpendicular recording media with similar beneficial consequences for the growth of the graphene hard overcoat.

Figure 2:
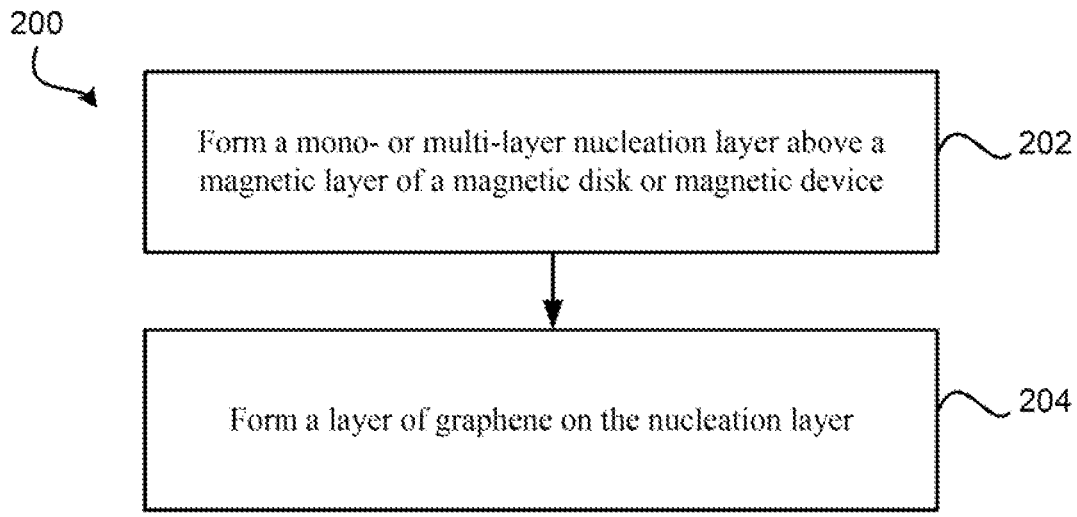
FIG. 2 is a flow diagram of a method for growing a graphene hard overcoat according to one general embodiment.

FIG. 2 depicts a method 200 for growing a graphene hard overcoat according to one general embodiment. In step 202, a mono- or multi-layer nucleation layer is formed above a magnetic layer of a magnetic disk or magnetic device such as a magnetic head, sensor for biological applications, etc., where the magnetic layer may be a recording layer in a disk, a free layer and/or shield in a reader, a write pole in a writer, etc. In this and other embodiments, the thickness of the nucleation layer may be between about 0.2 and about 5.0 nm, preferably between about 0.2 and about 1.0 nm for magnetic recording applications. For magnetic storage applications, it is generally desirable to have the nucleation layer be as thin as possible to minimize the magnetic spacing between the medium and transducer. Thus, in one particularly preferred approach, the thickness of the nucleation layer is between about 0.2 nm and about 0.7 nm. In other approaches, the nucleation layer may be thicker than the range presented here.

In one preferred embodiment, the nucleation layer is Ru; however other materials such as Ni, Cu, Co, Fe, Pd, Pt, Ir, TaC, TiC, WC may be employed.

In step 204, a layer of graphene is formed on the nucleation layer. In some approaches, the graphene layer is about as thick as one carbon atom. In other embodiments, the graphene layer may be thicker. Moreover, multiple layers of graphene may be formed.

A combined thickness of the nucleation layer and the graphene layer may be between about 0.5 nm and about 7.0 nm (or higher), and preferably between about 0.5 nm and about 3.0 nm. For magnetic storage applications, it is generally preferred to have a thinnest possible nucleation layer and a graphene monoatomic layer.

A method 300 to grow graphene as a hard overcoat on magnetic media, according to one particularly preferred embodiment, is next described with reference to FIG. 3. Note that the same general process may be used to form a graphene layer on a device. The five steps indicated in the drawing include the deposition of a nucleation layer for the epitaxial growth of graphene, the adsorption on the surface of the nucleation layer of the carbon precursor, the formation of the graphene overcoat, and the residual precursor gas products removal and an optional cooling cycle if needed.

Figure 3:
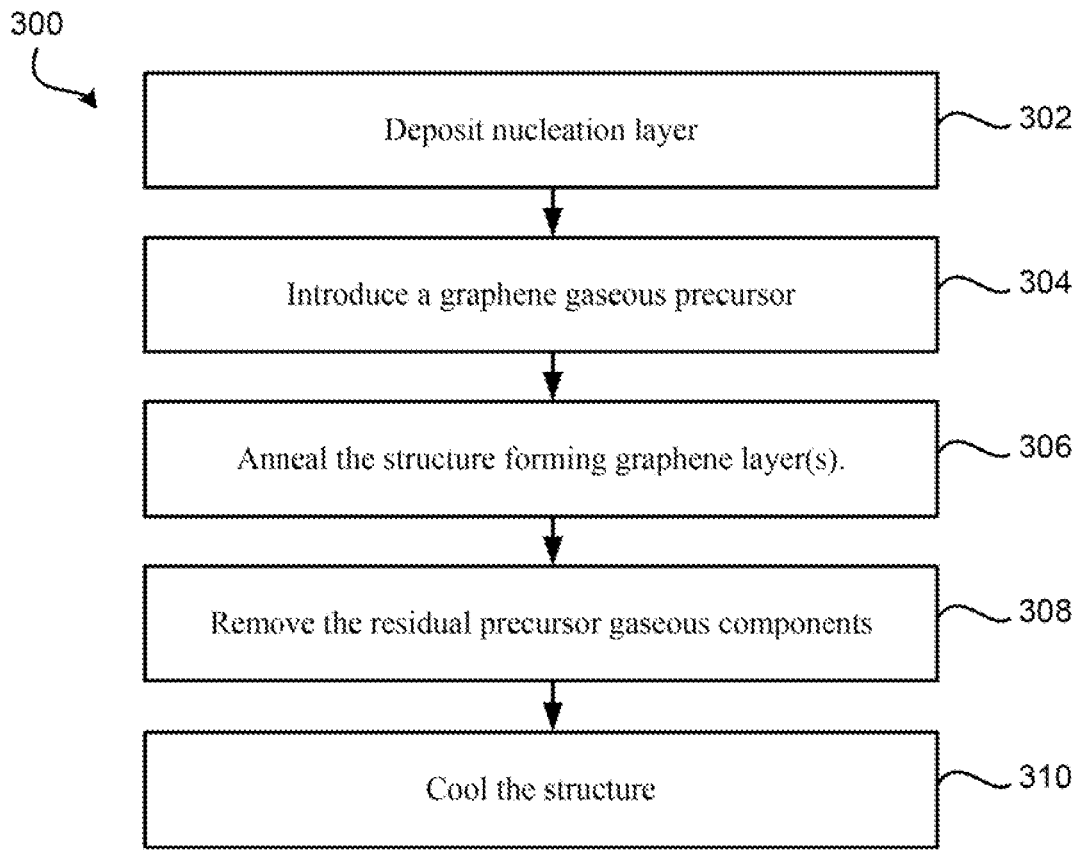
FIG. 3 is a flow diagram of a method for growing a graphene hard overcoat according to one embodiment.

While not shown in FIG. 3, if the magnetic media is being formed, the media stack growth is completed up to at least the recording and any ancillary writing layers. The procedure to generate the graphene hard overcoat is initiated in step 302 with the deposition of a judiciously chosen nucleation layer, which is preferably effected in a growth module into which the media stack is transferred following the growth of the magnetic layers. This chamber in one approach is equipped with hardware which may include, but is not limited to, in-situ heating, thin film growth capabilities and processing to facilitate the formation of an ultrathin seed layer with the correct growth orientation and lattice parameters to epitaxially grow the graphene overlayer. The heating source is preferably a directional heater, e.g., one that provides localized surface heating of the underlying magnetic layers rather than heating of the bulk structure. This localized heating helps prevent deleterious changes of their structural and magnetic parameters, as discussed in more detail below. In one preferred embodiment, the nucleation layer is Ru; however other materials such as Ni, Cu, Co, Fe, Pd, Pt, Ir, TaC, TiC, WC may be employed. In this and other embodiments, the thickness of the nucleation layer may be between about 0.2 and about 5.0 nm, preferably between about 0.2 and about 1.0 nm for magnetic recording applications.

Heat may be applied during formation of the nucleation layer. Preferably, directional heating is used during formation of the nucleation layer for heating the nucleation layer above an ambient temperature present in the chamber in which the nucleation layer is being formed. This provides heat to the nucleation layer to aid in proper growth without causing heat damage to the underlying structure. An illustrative temperature range at the outer surface of the nucleation layer during processing is between about 100 and 1000° C., but temperatures selected may be higher or lower than this range. Note, however, that when fabricating structures for magnetic recording applications, it is generally preferred that lower temperatures be used to avoid such adverse effects as heat-induced interlayer diffusion as well as heat-induced structural and compositional changes to the underlying layer(s).

In step 304, a graphene gaseous precursor is introduced. Illustrative precursors include acetylene, ethylene, propylene, benzene, ethanol, carbon monoxide, and a liquid precursor of a type known in the art or other gaseous precursor of a type known in the art. In one approach, the recording stack coated with the nucleation layer is exposed to a gaseous graphene precursor. Other approaches known in the art may also be used. Mixtures of precursors may also be used. Preferably, the graphene layer is formed from a graphene precursor that releases carbon at temperatures below 500° C. In one preferred embodiment of the invention, the precursor species is acetylene, as the decomposition of said gas to release carbon at the surface is significantly lower than for other precursors such as methane. The precursor may be introduced in the same growth module as the graphene nucleation layer (step 302), or may be introduced in a subsequent chamber, wherein additional processing steps can be implemented to optimize the adsorption, dehydrogenation and/or the solid state growth of the graphene hard overcoat.

In step 306, the structure is annealed for forming the graphene layer(s). Again, directional heating may be used during formation of the graphene layer for heating the graphene layer above an ambient temperature present in the chamber in which the graphene layer is being formed, which may be the same or different chamber as where the nucleation layer was formed. As with the nucleation layer formation, the directional heating provides heat to the graphene layer to aid in proper growth without causing heat damage to the underlying structure. An illustrative temperature range at the outer surface of the graphene layer during processing is between about 100 and 1000° C., but temperatures selected may be higher or lower than this range. Note, however, that when fabricating structures for magnetic recording applications, it is generally preferred that lower temperatures be used to avoid such adverse effects as heat-induced interlayer diffusion as well as heat-induced structural and compositional changes to the underlying layer(s).

In step 308, the residual precursor gaseous components are removed. Any suitable method of removing the residual graphene precursor material, with illustrative approaches including mechanical pumping, introduction of additional gas to form a more volatile by-product, etc.

It is noted that there are some potential advantages in effecting steps 306 and 308 in a separate chamber, as it can permit the usage of additional hardware (heating modules, gas injection, surface induced adatom mobility (such as ion-beam assisted growth), high throughput pumping equipment for the removal of gaseous by-products and in general to avoid contamination or interdiffusion of the residual products into the nucleation layer.

In optional step 310, the complete structure may be introduced into a cooling station to reduce the stack temperature in order to prevent reactions with air components as the complete recording media structure containing the graphene overcoat exits from the growth chamber into the clean room environment. Efficient methods to rapidly cool thin films include but are not limited to, exposure of the hot media stack to high pressure, fast flowing He gas as it is well known in the art.

In a second illustrative embodiment of the invention, the role of the nucleation layer is effected by a ferromagnetic layer (Co, Ni, Fe and their alloys) which is an integral part of the write assist layers (capping layers) of the recording stack or other structure. The flow process for the formation of the graphene hard overcoat is similar to the one described for the preferred embodiment using the concepts described in reference to FIG. 3.

Figure 4:
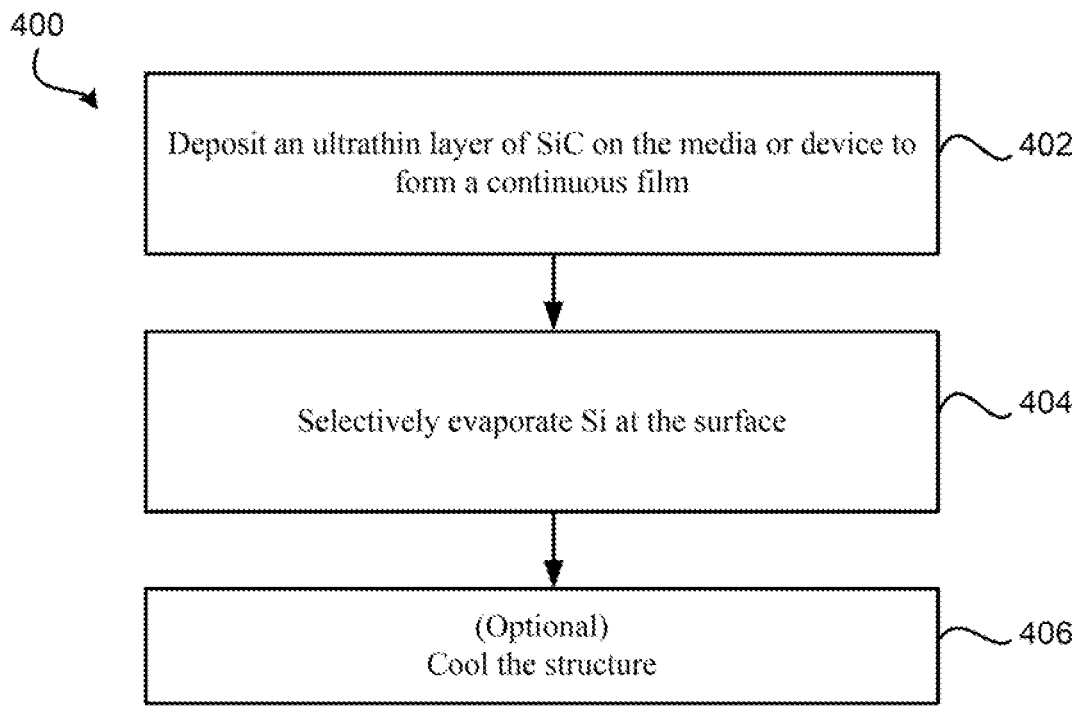
FIG. 4 is a flow diagram of a method for growing a graphene hard overcoat according to one embodiment.

A third illustrative embodiment of the invention is shown in the method 400 of FIG. 4. In step 402, an ultrathin layer of SiC is first deposited on the media or device to form a continuous film. For example, the SiC layer may be equivalent to several monolayers thick. The SiC overcoated magnetic recording stack is then introduced into an adjacent chamber, wherein with the assistance of surface heating, selective evaporation of Si at the surface, is effected in step 404, leaving behind an atomically thin graphene layer adhered to the underlying SiC structure. A combined thickness of the SiC and graphene may be between about 0.5 nm and about 7.0 nm, preferably between about 0.5 nm and about 3.0 nm for magnetic recording applications, but could be higher or lower than these ranges in other embodiments.

As in the embodiment of the invention discussed with reference to FIG. 3, the formation of the graphene layer through this approach may be followed by a cooling cycle in step 406 to prevent reactions with air components which may lead to contamination via gas transport through the overcoat layers (SiC/C).

Figure 5:
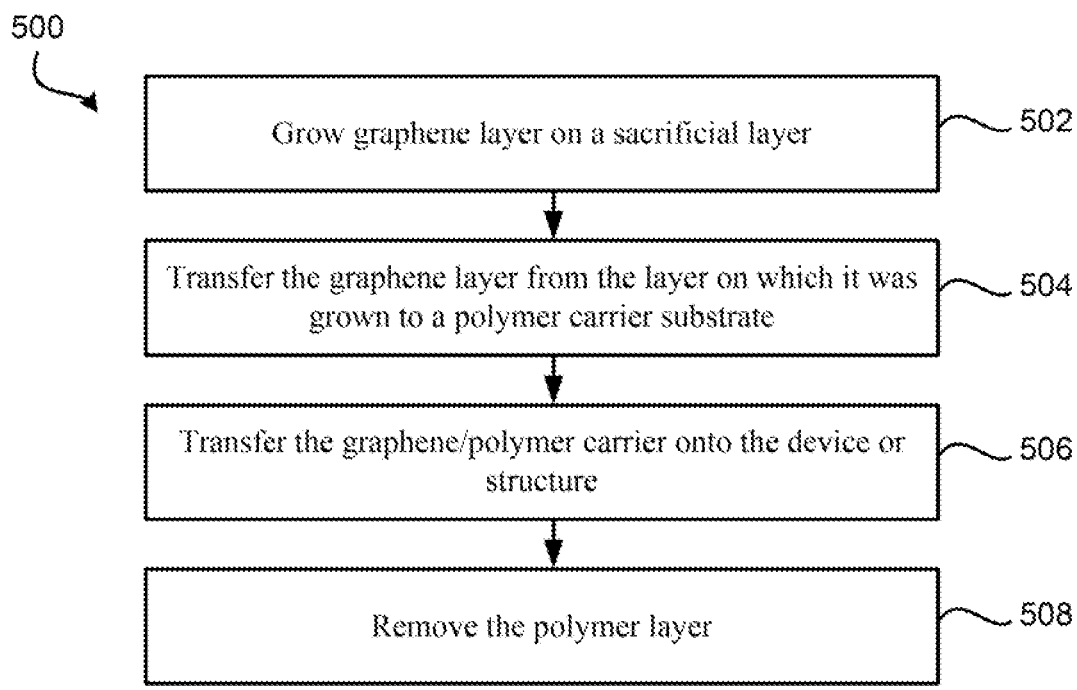
FIG. 5 is a flow diagram of a method for growing a graphene hard overcoat according to one embodiment.

In a fourth illustrative embodiment of the invention, shown in FIG. 5, an alternative method 500 to employ graphene as a hard overcoat is described. For some applications, the high temperatures inherent for the growth of graphene on a suitable nucleation layer or from SiC are prohibitive and detrimental to device functionality. Thus, this method may be preferable to others in situations where low temperatures are needed, lower cost is desired, etc. In this case, the graphene layer is grown on a sacrificial layer such as Cu, possibly in a separate deposition tool, in step 502. In step 504, the graphene layer is transferred from the layer on which it was grown to a polymer carrier substrate. This can be effected by spin casting the polymer on the graphene surface and subsequently selectively etching the sacrificial layer used for graphene growth in a suitable etchant. In step 506, the graphene/polymer carrier is transferred onto the device or structure that requires the hard overcoat. This can be accomplished via hydrostatic pressure, e.g., pressure contact, and heat in a chamber equipped with the correct mechanical hardware and ancillary equipment to provide intimate contact between the graphene/polymer carrier and the substrate upon which the desired device or magnetic structures have been deposited. Transfer of the graphene/polymer dual layer is achieved through van-der-Waal forces between the magnetic structure and the graphene layer. In step 508, the polymer layer is removed, e.g., by being dissolved in suitable solvent solutions, solvent vapors; removal by dry etching, e.g., reactive ion etching; etc.

Figure 6:
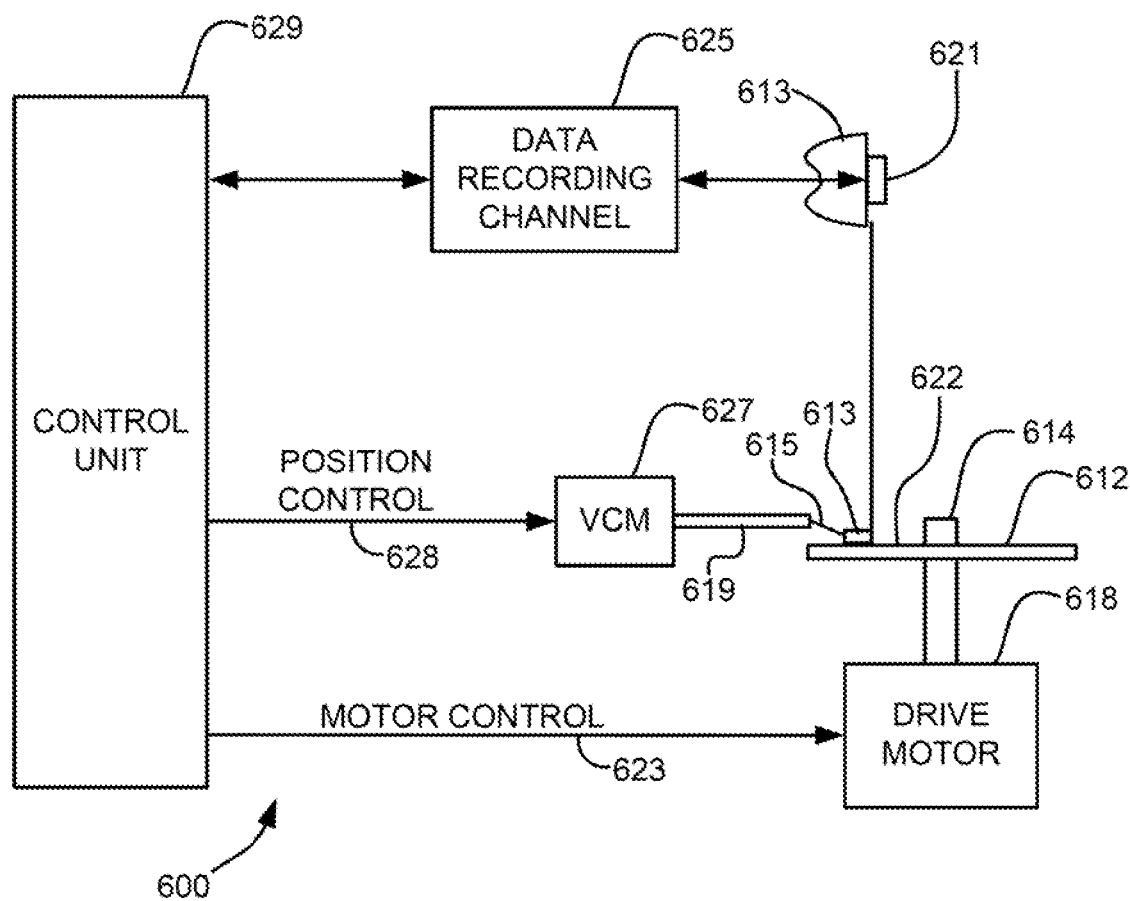
FIG. 6 is a simplified drawing of a magnetic recording disk drive system.

To provide an example of an environment in which the foregoing graphene overcoat may be used, FIG. 6 is a simplified drawing of a magnetic recording disk drive system.

Referring now to FIG. 6, there is shown a disk drive 600 in accordance with one embodiment of the present invention. As shown in FIG. 6, at least one rotatable magnetic disk 612 is supported on a spindle 614 and rotated by a disk drive motor 618. The magnetic recording on each disk is typically in the form of an annular pattern of concentric data tracks (not shown) on the disk 612.

At least one slider 613 is positioned near the disk 612, each slider 613 supporting one or more magnetic read/write heads 621. As the disk rotates, slider 613 is moved radially in and out over disk surface 622 so that heads 621 may access different tracks of the disk where desired data are recorded and/or to be written. Each slider 613 is attached to an actuator arm 619 by means of a suspension 615. The suspension 615 provides a slight spring force which biases slider 613 against the disk surface 622. Each actuator arm 619 is attached to an actuator 627. The actuator 627 as shown in FIG. 1 may be a voice coil motor (VCM). The VCM comprises a coil movable within a fixed magnetic field, the direction and speed of the coil movements being controlled by the motor current signals supplied by controller 629.

During operation of the disk storage system, the rotation of disk 612 generates an air bearing between slider 613 and disk surface 622 which exerts an upward force or lift on the slider. The air bearing thus counter-balances the slight spring force of suspension 615 and supports slider 613 off and slightly above the disk surface by a small, substantially constant spacing during normal operation. Note that in some embodiments, the slider 613 may slide along the disk surface 622.

The various components of the disk storage system are controlled in operation by control signals generated by control unit 629, such as access control signals and internal clock signals. Typically, control unit 629 comprises logic control circuits, storage (e.g., memory), and a microprocessor. The control unit 629 generates control signals to control various system operations such as drive motor control signals on line 623 and head position and seek control signals on line 628. The control signals on line 628 provide the desired current profiles to optimally move and position slider 613 to the desired data track on disk 612. Read and write signals are communicated to and from read/write heads 621 by way of recording channel 625.

The above description of a typical magnetic disk storage system, and the accompanying illustration of FIG. 6 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic disk, comprising:
    a perpendicular magnetic recording layer; and
    a single graphene monoatomic layer formed above the perpendicular magnetic recording layer as a continuous film extending across the perpendicular magnetic recording layer, wherein the graphene monoatomic layer is a single atomic sheet of $sp^2$-bonded carbon atoms that are densely packed in a honeycomb crystal lattice, wherein the graphene monoatomic layer is one carbon atom in thickness, and wherein only one graphene monoatomic layer is present above the perpendicular magnetic recording layer; and a lubricant layer directly on the single monoatomic layer of graphene.

2. The magnetic disk as recited in claim 1, further comprising a nucleation layer formed between the perpendicular magnetic recording layer and the graphene monoatomic layer, the nucleation layer being configured for adsorption of a carbon precursor on an upper surface of the nucleation layer.

3. The magnetic disk as recited in claim 2, wherein the single graphene monoatomic layer is formed directly on and is conformal to the nucleation layer.

4. The magnetic disk as recited in claim 3, wherein a thickness of the nucleation layer and the graphene monoatomic layer together is between about 0.5 nm and about 3.0 nm.

5. The magnetic disk as recited in claim 2, wherein the nucleation layer comprises at least one metal selected from a group consisting of Ru, Ni, Cu, Co, Fe, Pd, Pt, Ir, TaC, TiC, and WC.

6. The magnetic disk as recited in claim 2, wherein a thickness of the nucleation layer is between about 0.2 and about 1.0 nm.

7. The magnetic disk as recited in claim 2, wherein a thickness of the nucleation layer and the graphene monoatomic layer together is between about 0.5 nm and about 7.0 nm.

8. The magnetic disk as recited in claim 1, wherein the graphene monoatomic layer is configured to provide corrosion protection to the perpendicular magnetic recording layer.

9. The magnetic disk as recited in claim 1, wherein the graphene monoatomic layer extends above an entirety of an upper surface of the perpendicular magnetic recording layer.

10. The magnetic disk as recited in claim 1, wherein the magnetic disk is a bit patterned medium.

11. The magnetic disk as recited in claim 1, wherein the graphene monoatomic layer has a structural property of being impermeable to atomic helium.

12. The magnetic disk as recited in claim 1, wherein the graphene monoatomic layer is a contiguous sheet extending across all of the recording layer.

13. A method, comprising:
    forming a nucleation layer above the perpendicular magnetic recording layer of the magnetic disk of claim 1; and
    forming the graphene monoatomic layer on the nucleation layer.

14. The method as recited in claim 13, wherein the nucleation layer comprises at least one metal selected from a group consisting of Ru, Ni, Cu, Co, Fe, Pd, Pt, Ir, TaC, TiC, and WC.

15. The method as recited in claim 13, wherein a thickness of the nucleation layer is between about 0.2 and about 5.0 nm.

16. The method as recited in claim 13, further comprising using directional heating during formation of the nucleation layer for heating the nucleation layer above an ambient temperature.

17. The method as recited in claim 13, further comprising using directional heating during formation of the graphene layer for heating the graphene monoatomic layer above an ambient temperature.

18. The method as recited in claim 13, wherein the graphene monoatomic layer is formed from at least one graphene precursor selected from a group consisting of acetylene, ethylene, propylene, benzene, ethanol, carbon monoxide, and a liquid precursor.

19. A magnetic disk, comprising:
    a recording layer;
    a nucleation layer formed above the recording layer; and
    a continuous film formed above and extending across an entirety of the nucleation layer, the continuous film consisting of a single monoatomic layer of graphene, wherein the monoatomic layer of graphene is one carbon atom in thickness, wherein the monoatomic layer of graphene is a single atomic sheet of $sp^2$-bonded carbon atoms that are densely packed in a honeycomb crystal lattice, wherein the monoatomic layer of graphene has a structural property of being impermeable to atomic helium, wherein the monoatomic layer of graphene acts as a protective film that protects the recording layer from corrosion, and wherein only one monoatomic layer of graphene is present above the recording layer.

20. The magnetic disk as recited in claim 19, wherein a thickness of the nucleation layer and the graphene monoatomic layer together is between about 0.5 nm and about 3.0 nm, and further comprising a lubricant layer directly on the single monoatomic layer of graphene.

* * * * *